United States Patent
McClenahan et al.

(10) Patent No.: US 9,778,030 B2
(45) Date of Patent: Oct. 3, 2017

(54) METHOD AND APPARATUS FOR MULTI-AXLE VEHICLE ALIGNMENT WITH VEHICLE FRAME REFERENCE

(71) Applicant: Hunter Engineering Company, St. Louis, MO (US)

(72) Inventors: James W. McClenahan, St. Louis, MO (US); Michael T. Stieff, Wentzville, MO (US); John M. Boncek, Maryland Heights, MO (US); Timothy A. Strege, Sunset Hills, MO (US); Nicholas J. Colarelli, III, Creve Coeur, MO (US)

(73) Assignee: Hunter Engineering Company, St. Louis, MO (US)

( * ) Notice: Subject to any disclaimer, the term of this patent is extended or adjusted under 35 U.S.C. 154(b) by 641 days.

(21) Appl. No.: 14/200,564

(22) Filed: Mar. 7, 2014

(65) Prior Publication Data

US 2014/0253909 A1 Sep. 11, 2014

Related U.S. Application Data

(60) Provisional application No. 61/774,818, filed on Mar. 8, 2013.

(51) Int. Cl.
*G01B 11/275* (2006.01)

(52) U.S. Cl.
CPC ...... *G01B 11/2755* (2013.01); *G01B 2210/12* (2013.01); *G01B 2210/143* (2013.01);
(Continued)

(58) Field of Classification Search
CPC .................................. G01B 11/275; G01C 1/00
See application file for complete search history.

(56) References Cited

U.S. PATENT DOCUMENTS 5,488,472 A * 1/1996 January ............. G01B 11/2755
33/288
5,675,515 A 10/1997 January
(Continued)

FOREIGN PATENT DOCUMENTS

| EP | 0757779 B1 | 9/2001 |
| EP | 1677071 A1 | 7/2006 |
| WO | 2013041252 A1 | 3/2013 |

OTHER PUBLICATIONS

JOSAM product literature, Josam i-track, form No. T 124-1, dated Oct. 2008, Orebro, Sweden.
(Continued)

*Primary Examiner* — Luke Ratcliffe
(74) *Attorney, Agent, or Firm* — Polster, Lieder, Woodruff & Lucchesi, LC

(57) ABSTRACT

A vehicle wheel service system including a plurality of sensors positioned in proximity to a heavy-duty multi-axle vehicle, to measure angles associated with three or more axles of the vehicle without repositioning the mounting of the sensors after initiating a measurement procedure. Additional sensors, associated with a vehicle reference, such as the vehicle frame axis, are disposed to provide vehicle reference measurement data which is communicated to a processing system. The processing system is configured with software instructions to evaluate the measurement data and to determine various vehicle wheel alignment angle measurements and/or necessary vehicle adjustments for each axle relative to the vehicle reference or to a fixed axle having a determined relationship to the vehicle reference.

20 Claims, 9 Drawing Sheets

(52) U.S. Cl.
CPC ...... *G01B 2210/20* (2013.01); *G01B 2210/24* (2013.01); *G01B 2210/28* (2013.01); *G01B 2210/30* (2013.01)

(56) References Cited

U.S. PATENT DOCUMENTS

| | | | | |
|---|---|---|---|---|
| 5,724,128 A | * | 3/1998 | January | G01B 11/275 33/203.18 |
| 6,483,577 B2 | | 11/2002 | Stieff | |
| 7,974,806 B1 | | 7/2011 | Burns et al. | |
| 2003/0030791 A1 | * | 2/2003 | O'Harra | G01B 11/275 356/139.09 |

OTHER PUBLICATIONS

YECEN product literature, YS-808A-4 (4pcs cameras), webpage printout http://www.yecen.com/productsDetail.aspx?id=145, copyright 2012, Shanghai.

YECEN product literature, YS-808A-8 (8-10pcs cameras), webpage printout http://www.yecen.com/productsDetail.aspx?id=141, copyright 2012, Shanghai.

IP.COM publication, Multi-Axle Vehicle Wheel Alignment System, Publication No. IPCOM000136159D, Apr. 13, 2006.

January, D., "Steering Geometry and Caster Measurement," SAE Technical Paper 850219, 1985, doi:10.4271/850219.

* cited by examiner

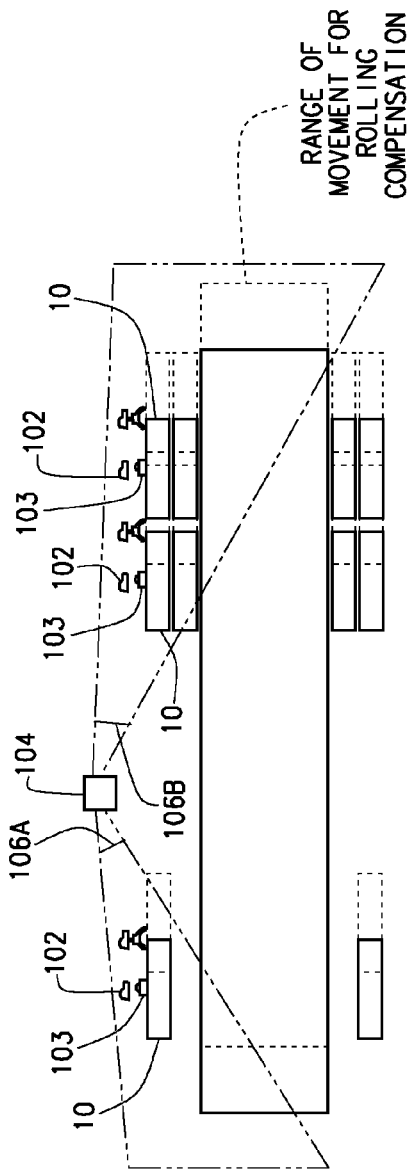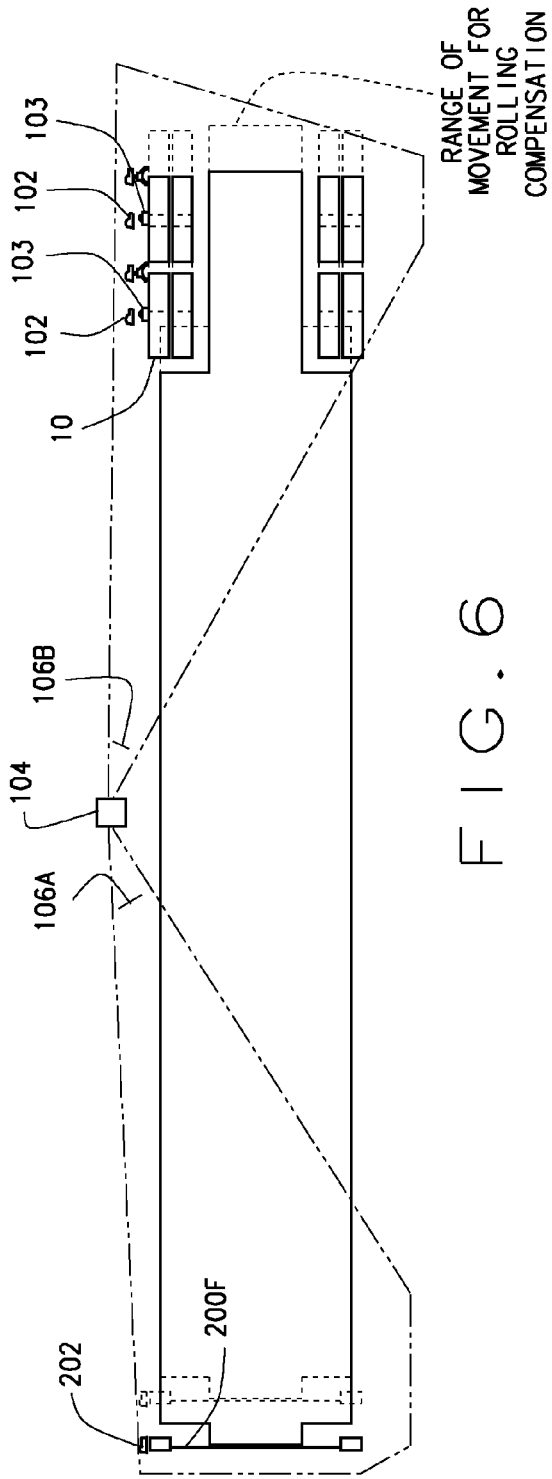

METHOD AND APPARATUS FOR MULTI-AXLE VEHICLE ALIGNMENT WITH VEHICLE FRAME REFERENCE

CROSS-REFERENCE TO RELATED APPLICATIONS

The present application is related to, and claims priority from, U.S. Provisional Patent Application Ser. No. 61/774,818 filed Mar. 8, 2013, and which is herein incorporated by reference.

STATEMENT REGARDING FEDERALLY SPONSORED RESEARCH

Not Applicable.

BACKGROUND OF THE INVENTION

The present application relates to machine vision vehicle wheel alignment systems configured to measure the alignment of the wheels of a motor vehicle, and in particular, to a machine vision vehicle wheel alignment system configured with a set of imaging sensors disposed in spaced-apart proximity to a heavy-duty motor vehicle having two or more axles in order to observe targets individually mounted to each axle of the vehicle and to the vehicle frame, to determine a set of vehicle wheel alignment angle measurements.

It is well known that improper alignment of the wheels of a vehicle can have adverse effects on vehicle handling, vehicle fuel consumption, and tire wear. The problems associated with misalignment of vehicle wheels are further exacerbated on vehicles having more than two axles, such as heavy-duty trucks, busses, and trailers, which commonly include a steering axle and at least one fixed tandem axle combination.

Various machine vision vehicle wheel alignment systems have been designed to facilitate the measurement and alteration of vehicle wheel alignment angles on light-duty vehicles having two axles, such as light trucks and passenger cars. For example, U.S. Pat. No. 5,675,515 to January utilize machine vision sensors to observe optical targets or identifiable features associated with the vehicle wheels to determine position and orientation in three-dimensional space, from which alignment angles can be mathematically determined. Optical targets utilized by the machine vision vehicle wheel alignment systems can be mounted to the vehicle structure and vehicle wheels in any of a number of known methods, including with the use of wheel adapters configured to grip tire surfaces, wheel rim edges, or both surfaces of a vehicle wheel.

Procedures and methods by which additional vehicle wheel alignment angles such as caster and steering axis inclination can be determined from measurements of the wheel toe angles and camber alignment angles are well known, and are described in SAE Publication 850219 to January, entitled "Steering Geometry and Caster Measurement". In addition to determining vehicle wheel alignment angles and measurements, it is known to measure the actual distances between vehicle wheels on different axles. When determining alignment angles, such as toe angles, for a vehicle having two axles, the individual toe angles of each vehicle wheel must be defined relative to a longitudinal reference axis. In general, there are two different longitudinal reference axis which are conventional in the vehicle wheel alignment industry.

The reference axis utilized for measurement of the toe angle of the wheels on the rear (fixed) axle of a two-axle vehicle, such as a passenger car or light truck is commonly known as the "geometric centerline" of the vehicle, which is an axis between the center points of the two axles. For the steered vehicle wheels (front axle) of a two-axle vehicle, the individual toe alignment angles are defined to be relative to a reference axis commonly known as the "thrust line". The "thrust line" is practically determined as the bisector of the total rear toe angle. In essence, the thrust line is determined as the net pointing direction of the rear wheels in a two-axle vehicle, which means that the individual front toe alignment measurements for passenger cars and light trucks are intentionally sensitive to the toe alignment of the rear wheels.

There are a number of practical advantages in determining toe alignment angles relative to these two reference axis for vehicles having two axles. First, the toe angle adjustment of the rear wheels can be accomplished with the front wheels steered only approximately straight ahead. Second, the thrust line thus determined is approximately the line along which the center of the rear axle will travel when the vehicle moves in a straight line, and this line is made to point approximately through the centers of the front and rear axles. Third, the toe adjustment of the front wheels can be accomplished with the steering wheel held straight such that the front toe measurements are symmetric about the thrust line, thereby insuring that the steering wheel is straight when the vehicle moves in a straight line. Fourth, vehicle manufacturers have long provided toe alignment specifications which are relative to these two axes. Any vehicle alignment system which defines toe alignment relative to another axis will not be able to correctly align a vehicle to a manufacturer's specifications.

When aligning the wheels of a heavy-duty vehicle, and in particular, a heavy-duty vehicle having more than two axles, additional reference lines and angles must be measured, determined, and considered to achieve proper wheel alignment for all of the vehicle wheels. The geometric centerline of a heavy-duty vehicle, such as one having more than two axles, is defined as a line drawn through the midpoint of the front axle and the rear reference axle (which is typically the drive axle), as shown in FIG. 1. Correspondingly, a thrust line is defined as the bisector of the total toe angle of the selected reference axle with the thrust angle defined as the angle formed between the geometric centerline and the thrust line. Since vehicles with more than two axles typically have multiple rear axles, there can be multiple thrust lines and thrust angles, depending upon which axle is utilized as a reference axle. This is further complicated in some measurement systems by reference to the vehicle frame, i.e., the longitudinal centerline of the vehicle frame, as further illustrated in FIG. 1.

An angle formed between two thrust lines of a vehicle is referred to as the tandem scrub angle, and is indicative of a misalignment between the axles. The effect of this misalignment is that the wheels on the steer axle of the vehicle must be turned to offset the "push" of the tandem axles to maintain the vehicle moving in a straight-ahead direction, resulting in tire wear on every tire of the vehicle. This condition can be further amplified due to misalignment in the axles of towed trailers, such as in a tractor-trailer combination, resulting in rapid wear on all of the vehicle tires, increased fuel consumption, and poor vehicle handling.

For heavy duty trucks, and vehicles having more than two axles, an alternative reference line based on the centerline of the vehicle frame may be utilized in place of the geometric centerline or driven axle thrust line. For example, European Patent No. 0 757 779 B1 describes a system for measuring wheel angles and chassis unit positions of a vehicle in which a pair of lateral measurement scales are attached to a vehicle at the front in rear in a determined relationship to the vehicle longitudinal axis, and are illuminated/observed by wheel-mounted sensor units to enable the individual axles to be adjusted relative to the vehicle longitudinal axis.

Accordingly, when aligning a heavy-duty vehicle, such as one with more than two axles, a total alignment procedure is required in which every axle on the vehicle is measured and set parallel to an identified reference axis, such that all of the vehicle wheels roll in the same direction, minimizing the vehicle's rolling resistance.

In a conventional alignment procedure for a vehicle having more than two axles, wheel alignment angle sensors containing angle transducers and/or emitters are mounted on the wheels of the steer (front) axle and on one of the tandem drive axles, defined as the reference axle. If necessary, the sensors are compensated for runout in a conventional manner, which typically requires that the vehicle be jacked up or rolled to permit each wheels to be rotated to two or more positions at which measurements are acquired. Once the sensors are mounted and any necessary compensation completed, the rear reference axle is measured to determine a thrust angle. If the rear reference axle is adjustable, it is aligned such that the thrust line and the vehicle frame centerline are collinear. Next, the steer (front) axle of the vehicle is aligned relative to the rear reference axle. Subsequently, the alignment angle sensors are dismounted from the steer (front) axle of the vehicle, and moved to the second rear axle. The sensors are again compensated for runout if necessary, and the second rear axle is aligned relative to the rear reference axle. For other multi-axle vehicle configurations, such as vehicles with two or more steer axles, similar procedures are followed in which the sensors are moved from axle to axle as required to align all axles to a reference axle.

Accordingly, it would be advantageous to provide a vehicle alignment system with the capacity to obtain real-time alignment angle measurements from more than two axles on a multi-axle vehicle, together with any necessary vehicle reference axis measurements, eliminating the repetition associated with the need to reposition alignment angle sensors on multiple axles during the alignment of a multi-axle vehicle.

It would be further advantageous to provide a vehicle alignment system capable of acquiring real-time alignment angle measurements, together with measurements of a vehicle reference axis, using a set of passive optical targets mounted to the vehicle and a set of observing cameras positioned in spaced-apart proximity to the vehicle.

BRIEF SUMMARY OF THE INVENTION

Briefly stated, the present disclosure sets forth a vehicle wheel alignment system which is configured to acquire measurement data from multiple axles and vehicle references associated with a multi-axle vehicle without the need for repeated runout compensation procedures and/or repositioning of measurement sensors and/or optical targets after initial placement on the vehicle.

In one embodiment, the vehicle wheel alignment system of the present disclosure is a machine vision vehicle wheel alignment system, including a plurality of imaging sensors positioned in proximity to the vehicle, to view target features on optical targets associated with each axle of the multi-axle vehicle without repositioning the mounting of either the imaging sensors or the optical targets after initiating a wheel alignment measurement procedure. Additional target features, associated with optical targets on a vehicle reference, such as the vehicle frame axis, may be disposed within an operative field of view for at least one of the imaging sensors. Data acquired by each of the imaging sensors is communicated to a processing system, which is configured with software instructions to evaluate the acquired images and to determine various vehicle wheel alignment angle measurements and/or necessary vehicle adjustments for each axle.

In a further embodiment, the vehicle wheel alignment system of the present disclosure is a machine vision vehicle wheel alignment system, including a plurality of imaging sensors mounted to the wheels of one axle of a multi-axle vehicle, to view target features on optical targets associated with each additional axle and with a vehicle reference, such as the vehicle frame axis without repositioning the mounting of either the imaging sensors or the optical targets after initiating a wheel alignment measurement procedure. Data acquired by each of the imaging sensors is communicated to a processing system, which is configured with software instructions to evaluate the acquired images and to determine various vehicle wheel alignment angle measurements and/or necessary vehicle adjustments for each axle.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 5 is an illustration of the fields of view for the imaging sensors as seen in FIG. 2-4;

FIG. 6 is an illustration similar to FIG. 4, illustrating a semi-trailer box disposed within the operative field of view of the imaging sensors as seen in FIG. 2-4;

Corresponding reference numerals indicate corresponding parts throughout the several figures of the drawings. It is to be understood that the drawings are for illustrating the concepts set forth in the present disclosure and are not to scale.

Figure 1:
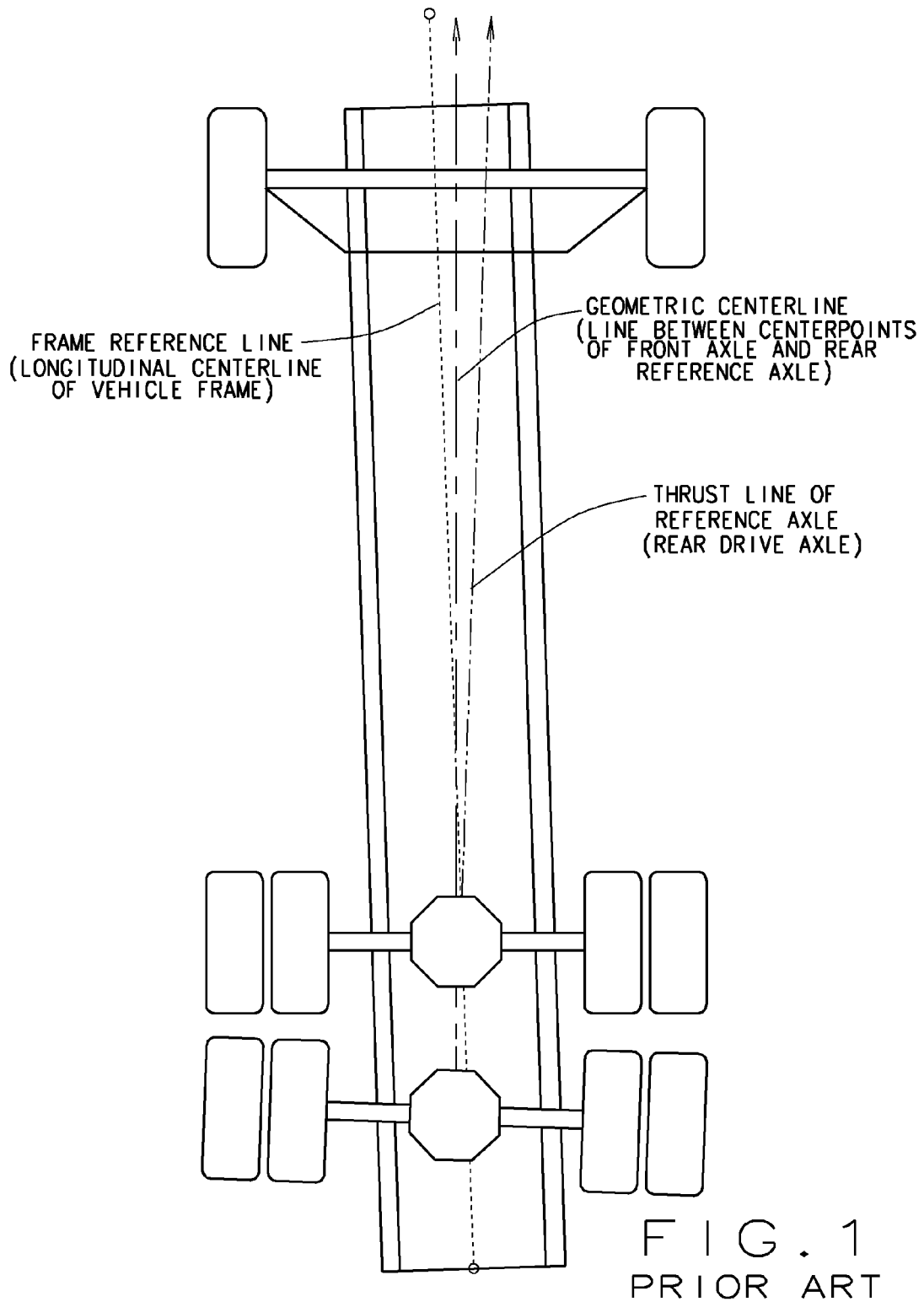
FIG. 1 is an illustration of a prior art geometric centerline, a prior art thrust line, and a prior art frame reference line of a vehicle, exaggerated to show the distinctions.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The present disclosure is described in one embodiment in the context of a machine vision vehicle wheel alignment or inspection system having optical measuring devices. The basic components and functionality of a machine vision system, including the construction of cameras or imaging sensors, optical targets, calibration procedures, image processing algorithms, and alignment angle computations are well understood in the art, and are not set forth herein. It is intended that the present disclosure may be utilized with a wide variety of machine wheel alignment or inspection systems, and is not limited to any specific construction of measuring devices such as cameras, optical targets, image processing algorithms, or computational procedures, so long as the system satisfies the limitations set forth herein. It will be further understood that portions of the present disclosure may be implemented utilizing a vehicle wheel alignment measurement or inspection system which does not utilize machine vision technology to acquire and process images of optical targets, but rather, which relies upon measurements obtained from measuring devices such as wheel-mounted angle sensor units, an example of which are the DSP-700 series sensors manufactured and sold by Hunter Engineering Company of St. Louis, Mo.

Figure 2:
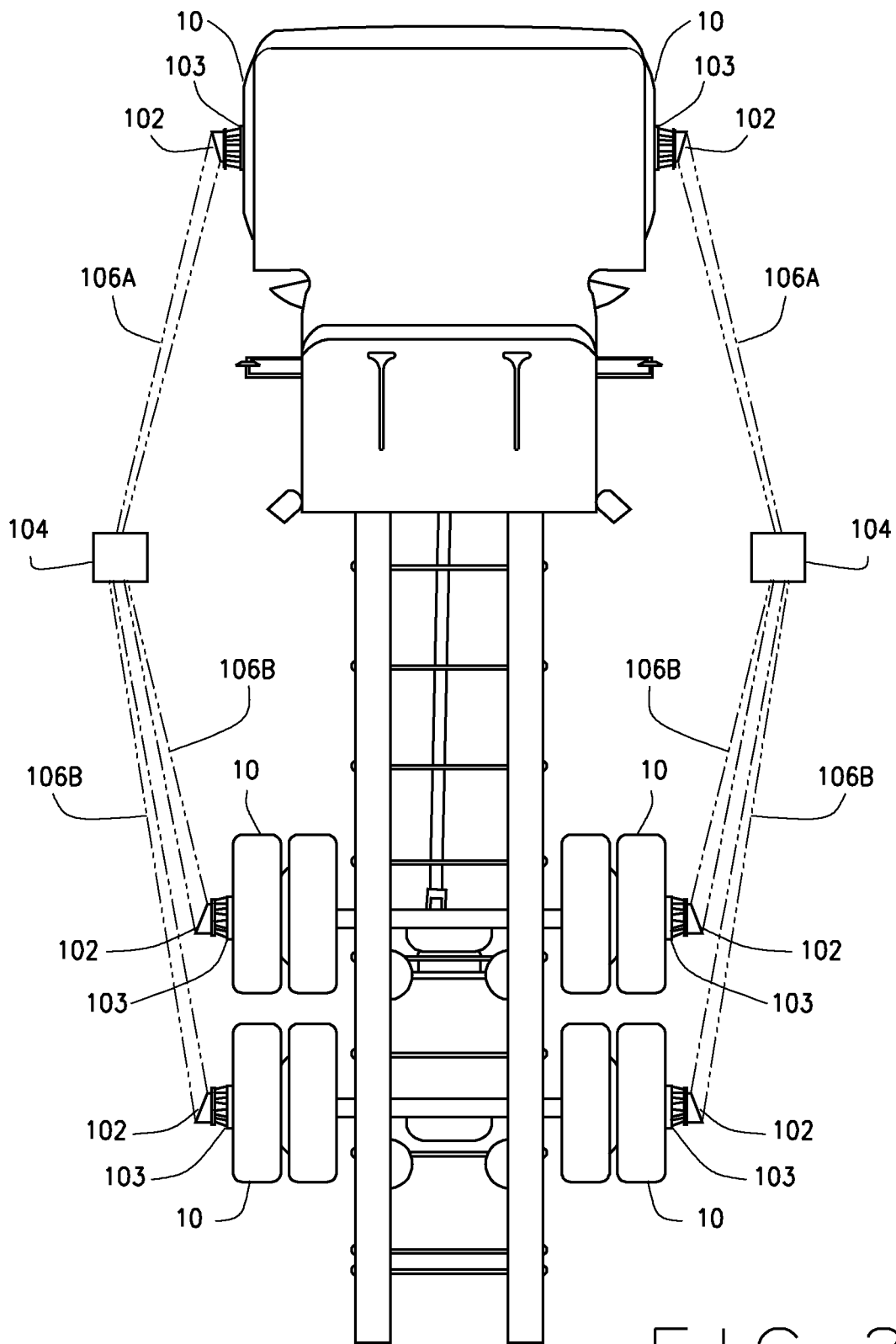
FIG. 2 is an illustration of a multi-axle truck having a set of optical targets mounted simultaneously at each axle for observation by imaging sensors.

Turning to the Figures, and to FIGS. 2-7 in particular, a machine vision vehicle wheel alignment or inspection system 100 of the present disclosure is illustrated for use with heavy-duty and multi-axle vehicles, such as trucks, buses, and semi-trailers. The system 100 consists generally of a processing system configured with suitable software instructions and an operator console (not shown), a set of optical targets 102 and associated mounting structures 103 which are adapted for attachment to the outermost wheel assemblies 10 on each axle of the vehicle undergoing measurement, and a set of imaging sensors 104, such as cameras or other suitable optical detectors, which are disposed in spaced apart proximity about a service area receiving the vehicle undergoing measurement, to acquire images which are communicated to the processing system. The imaging sensors 104 are positioned and oriented such that the optical targets 102 associated with each axle of the vehicle are concurrently within the operable fields of view 106 of the imaging sensors, as seen in FIG. 2.

Figure 3:
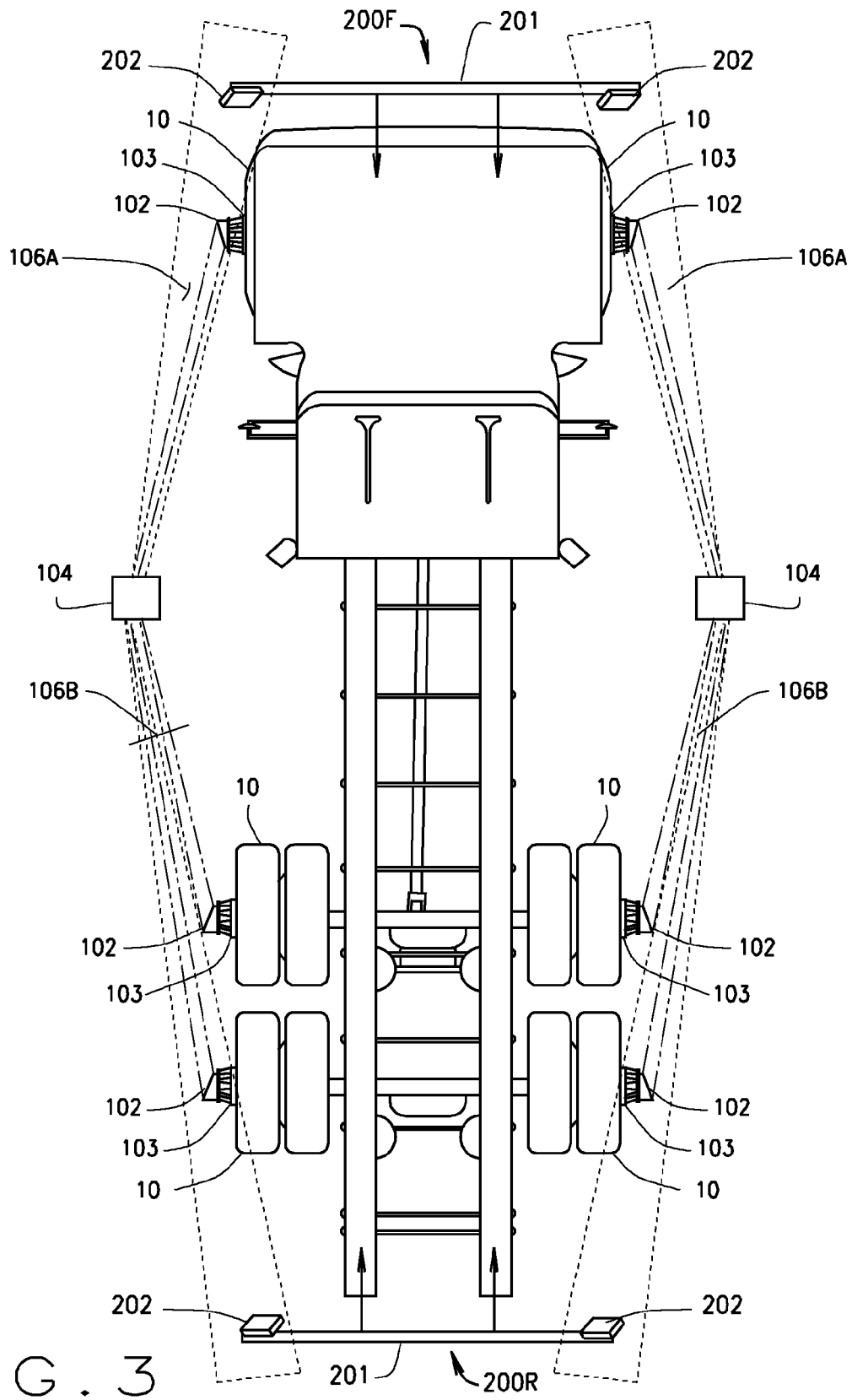
FIG. 3 is similar to FIG. 2, further including a set of frame reference target structures mounted to the vehicle frame for observation by the imaging sensors.

With long wheel-base vehicles, such as may be found with heavy-duty and multi-axle vehicles, it is preferable that multiple imaging sensors 104 be utilized on each side of the vehicle, and that they be positioned and oriented in an arrangement which avoids the need for any of the imaging sensors 104 to have long operable fields of view 106 for observing optical targets 102 at distances approaching or exceeding the wheelbase length of the vehicle. For example, as seen in FIGS. 2 and 3, a pair of imaging sensors 104 may be disposed adjacent to each longitudinal side of a vehicle, such as in a pedestal fixture located 108 in proximity to the vehicle's transverse midline. Within each pair of imaging sensors 104, a first imaging sensor is oriented to have an operative field of view 106a which encompasses optical targets 102 mounted to the front axle of a vehicle disposed within the service area. A second imaging sensor in the pair is oriented to have one or more operative fields of view 106b which encompass optical targets mounted to the rearward axles of the vehicle when the first imaging sensor is viewing the front axle. If the vehicle frame target structures 200F, 200R are provided, as shown in FIG. 3, vehicle frame reference targets 202 at the front and rear of the vehicle are preferably encompassed within the operative fields of view 106a, 106b of the first and second imaging sensors of each pair of sensors.

Figure 4:
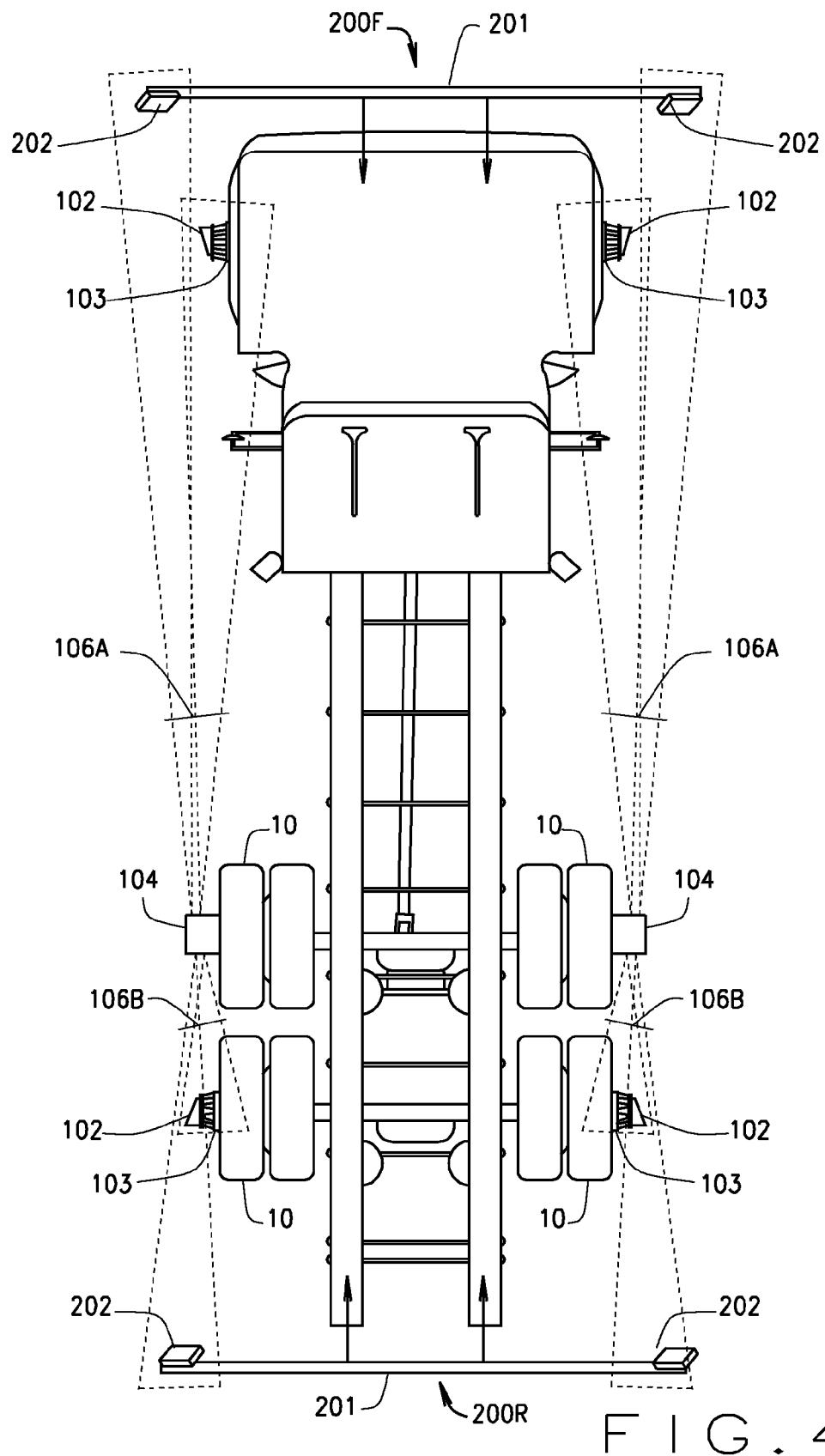
FIG. 4 is similar to FIG. 3, with the imaging sensors mounted to the intermediate axle of the vehicle for viewing each of the mounted optical targets and the set of frame reference targets.

Alternatively, as shown in FIG. 4, the pedestal fixtures 108 may be eliminated, and a pair of imaging sensors 104 is disposed on associated mounting structures 110 which are adapted for attachment to the outermost wheel assemblies 10 on opposite ends of one of the intermediate axles of the vehicle. Within each pair of imaging sensors 104, a first imaging sensor is oriented to have an operative field 106A of view which encompasses optical targets 102 mounted to the front axle of a vehicle disposed within the service area together with any frame reference targets 202 at the forward end of the vehicle. A second imaging sensor is oriented to have an operative field of view 106B which encompasses optical targets 102 mounted to the rearward axles of the vehicle when the first imaging sensor is viewing the front axle, together with any frame reference targets 202 at the rearward end of the vehicle. The associated mounting structures 110 may be configured to permit the imaging sensors 104 to freely rotate about an axis of rotation, maintaining generally stationary fields of view during rotation of the wheel assemblies on which they are mounted.

As can be seen in FIGS. 5 and 6, the fields of view of each of the camera or imaging sensor pairs 104 are preferably sufficient, when disposed adjacent to a longitudinal side of a vehicle, such as in the pedestal fixtures 108, for use with vehicles having a wide range of dimensions, and permit at least a limited range of rolling movement for the vehicle while maintaining the various optical targets 102 within the operative fields of view 106A, 106B.

Figure 7:
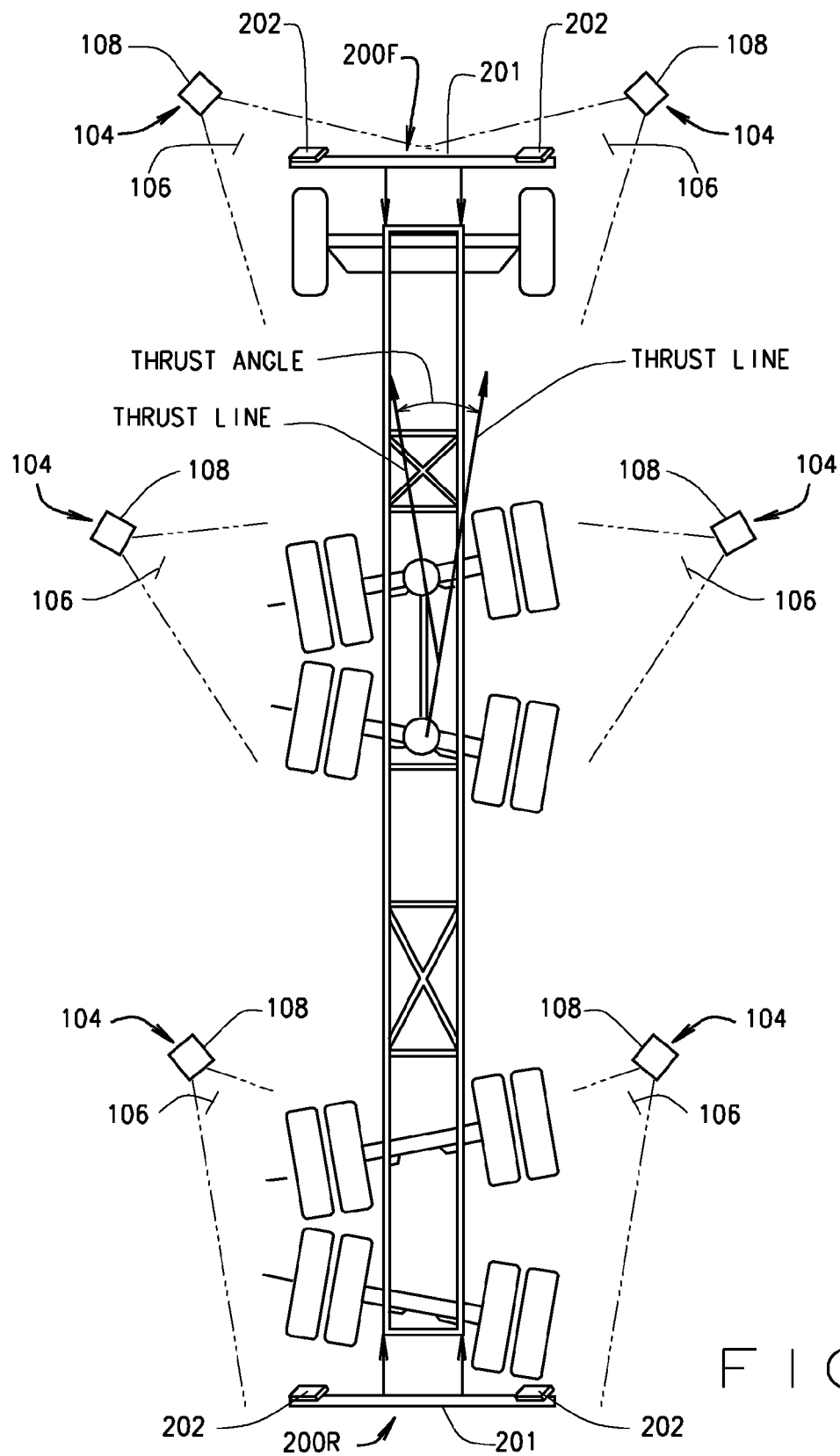
FIG. 7 is an example of an arrangement of multiple imaging sensors positioned to acquire images of multiple axles and optical targets on an extended length vehicle.

To facilitate measurement of long wheelbase vehicles, or those having a multitude of axles, additional imaging sensors 104 may be employed as necessary to view additional optical targets 102 in associated operative fields of view 106, either mounted to the same pedestal 108 as the first and second imaging sensors 104, or, as seen in FIG. 7, disposed at additional locations, such as on separate pedestals 108 or fixtures arrayed about the vehicle service area. Those of ordinary skill in the art will recognize that the spatial relationships between each of the imaging sensors 104 employed by the service system must be calibrated prior to use in order to establish a common reference frame for evaluating images and measurements. Any suitable method for calibration of a multi-camera machine vision vehicle service system and for the establishment of a common reference frame may be utilized, such as, but not limited to, the use of temporary calibration fixtures and/or common reference targets.

Once the imaging sensors 104 are calibrated to establish a common reference coordinate system, measurement of vehicle alignment angles may be carried out by mounting an optical target 102 to an outer wheel assembly 10 of each axle of a vehicle disposed within the operative fields of view of the camera or imaging sensor system. Mounting optical targets 102 to the outer wheel assemblies 10 on each axle of the vehicle enables the system to simplify the measurement procedures by completing a runout compensation for each mounted optical target 102 or measuring device in a common operation, such as during a single rolling movement of the vehicle. For example, during a rolling runout compensation process, images of each optical target 102 are initially acquired with the vehicle initially disposed in the vehicle service area, after which the vehicle is rolled a short distance (either forward or backwards) such that the optical targets 102 associated with each axle are rotated about an axis of rotation. Additional images acquired during and/or after the completion of the rolling movement are processed by the processing system together with the initially acquired images to identify the axis about which each optical target 102 rotates, from which appropriate runout compensation values associated with the mountings of the individual optical targets 102 may be determined.

With appropriate runout compensation parameters determined for each optical target 102, measurements of the vehicle wheel alignment angles at multiple axles of the vehicle may be concurrently determined by the processing system from images acquired by the imaging sensors 104 without the need to remount, reposition, or re-compensate the optical targets 102, and the results displayed to an operator together with guidance for completing any required wheel alignment angle adjustments to the vehicle axles.

The machine vision vehicle wheel alignment or inspection system is configured with suitable software instructions to use information acquired from the images of the optical targets 102 to facilitate adjustments to the vehicle wheel alignment angles. For example, a thrust-line alignment may be carried out by utilizing the spatial positions of optical targets 102 mounted on the front and rear axles of the vehicle to establish a geometric centerline of the vehicle, enabling the thrust axis of the reference axle (i.e., the rearmost drive axle) to be adjusted into parallel alignment therewith. Subsequent adjustments to each remaining axle of the vehicle are then made relative to the aligned thrust axis of the reference axle.

As an alternative to geometric centerline and thrust line alignment of the vehicle, the machine vision vehicle wheel alignment or inspection system may be configured with suitable software instructions to utilize additional optical targets mounted to reference points within the field of view of the imaging sensors to establish common references for alignment of each axle. For example, as seen in FIGS. 3 and 6, frame reference target structures 200F, 200R may be temporarily affixed to established mounting points on the frame of the vehicle to be measured (commonly found at the front and rear longitudinal ends of the vehicle frame). Each frame reference target structure 200 includes a target support bar 201 onto which one or more optical targets 202 are disposed in a known relationship relative to the mounting points, within the operative field of view of at least one observing imaging sensor 104. Images of the optical targets 202 on the frame reference target structures 200 are processed by the machine vision vehicle wheel alignment system to identify a frame reference axis of the vehicle within a common coordinate reference system, which may then be utilized as the reference axis relative to which each wheel assembly or axle of the vehicle is subsequently aligned. As best seen in FIG. 1, the frame reference line, the geometric centerline, and the thrust line of a vehicle's reference axle represent distinct reference axis associated with a vehicle, and as such, different alignment angle adjustments may be required for each wheel assembly or axle of a vehicle, depending upon which reference line is being utilized and any variation there between References utilized for the alignment of the wheel assemblies or axles of a vehicle using the machine vision vehicle wheel alignment or inspection system of the present disclosure are not limited to those which are based upon the structure of the vehicle itself, and may be based upon other features or structures in the vicinity of the vehicle. For example, a set of optical targets (not shown) may be associated with a fixed structure on which the vehicle is disposed, and observed by one or more imaging sensors 104 of the machine vision vehicle wheel alignment system to establish a ground or vehicle support surface reference plane.

Figure 8:
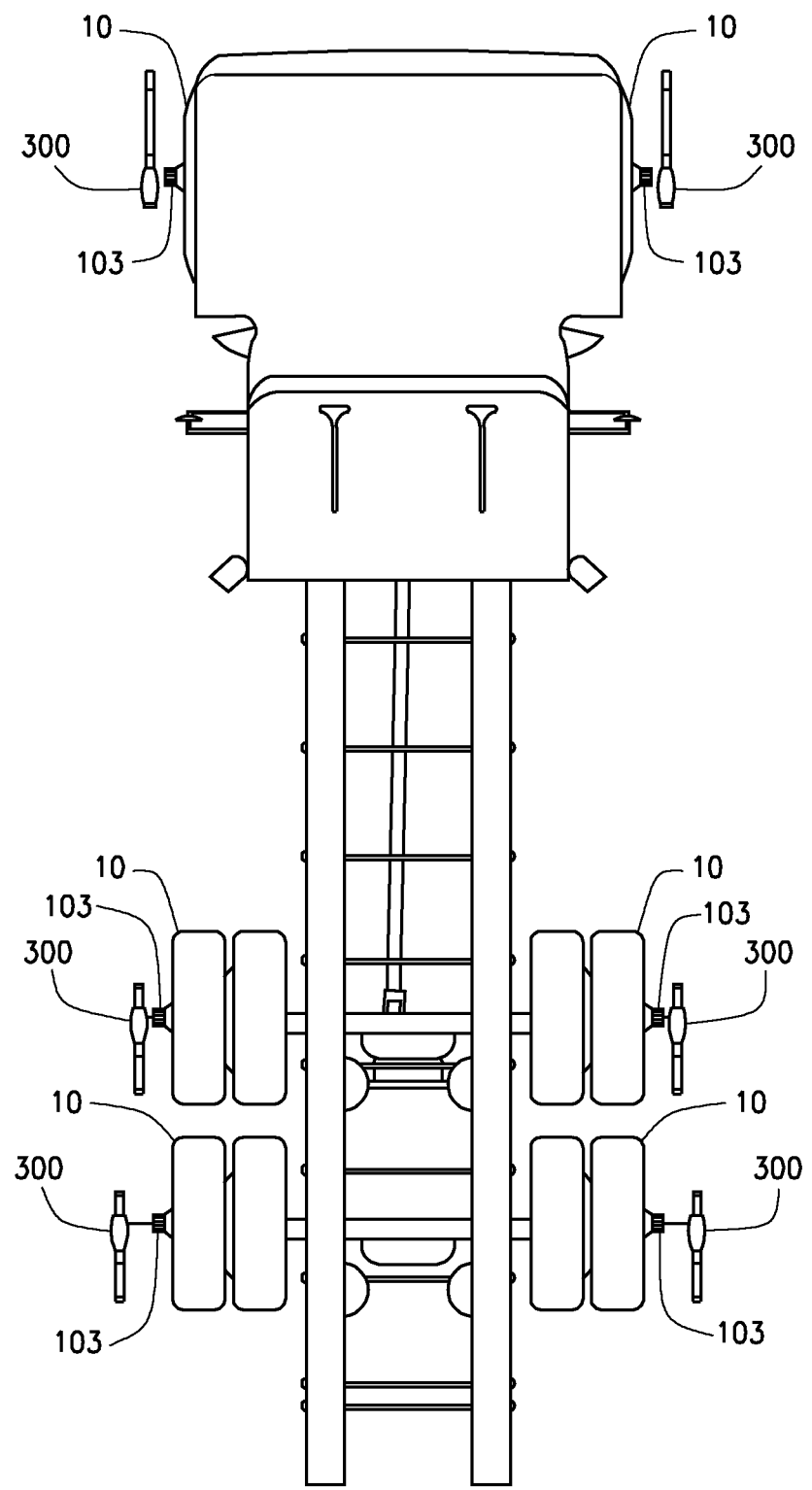
FIG. 8 is an illustration of a multi-axle truck having a set of alignment angle sensors mounted simultaneously at each axle.

While the present disclosure has been described generally in the context of a machine-vision vehicle wheel alignment or inspection system which employs measuring devices such as imaging sensors 104, optical targets 102, and image processing algorithms to evaluate and measure alignment angles and reference axis associated with the wheel assemblies and/or axles of a multi-axle vehicle, it will be recognized that a number of the inventive features associated therewith may be implemented utilizing a set of measuring devices consisting of angle sensors in place of the optical targets 102 and imaging sensors 104. For example, as seen in FIG. 8, a set of angle sensors 300 which are configured to measure angles relative to the direction of gravity, as well as angles relative to other angle sensors 300 mounted to adjacent wheel assemblies 10, may be mounted concurrently to each of the outermost wheel assembly of a vehicle's axles, enabling runout compensation procedures, such as shown in U.S. Pat. No. 7,974,806 to Burns, Jr. et al., herein incorporated by reference, for each sensor assembly 300 to be carried out simultaneously for each sensor. The sensor assemblies 300 may be configured such as shown in U.S. Pat. No. 6,483,577 B2 to Stieff, herein incorporated by reference, and operate using various combinations of optical emitters and detector elements to measure at least toe angles at each mounting location. Exemplary sensor assemblies 300 are the DSP-700 series wheel alignment angle sensors manufactured and sold by Hunter Engineering Company of St. Louis, Mo. With each sensor 300 mounted and compensated (if necessary), a set of wheel and axle alignment angle measurements can be quickly obtained from the sensor assemblies 300 for multiple wheels and/or axles of the vehicle, often without the need to move sensor assemblies 300 from one axle to another, or without the need to repeat the runout compensation procedures, thereby achieving a significant savings in the amount of time required to complete a total vehicle wheel alignment service to the vehicle.

However, when the number of axles on the vehicle exceed the number of available pairs of sensor assemblies 300, one or more pairs of sensor assemblies 300 are repositioned from measured axles to unmeasured axles and if necessary, are re-compensated for runout during the measurement procedures, while at least one pair of sensor assemblies 300 is maintained on a measured axle to establish an alignment reference axle as previously described.

Figure 9:
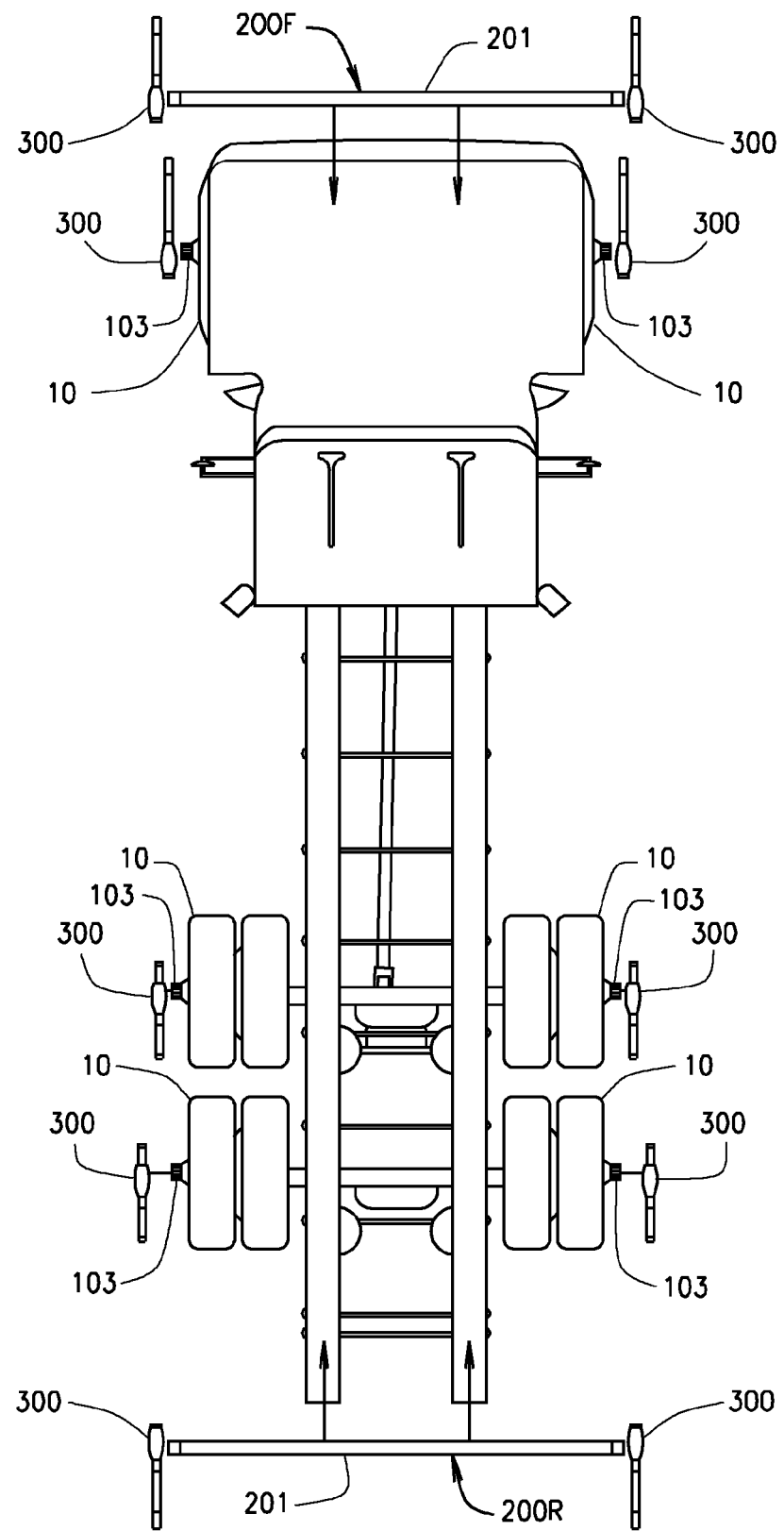
FIG. 9 is an illustration similar to FIG. 8, further including a set of frame reference target structures mounted to the vehicle frame for observation by alignment angle sensors.

As seen in FIG. 9, one or more additional references, such as the frame reference target structures 200 configured with suitable "targets" 202a for observation by the detectors of the sensor assemblies 300 associated with the front and rear axles of the vehicle may be mounted to suitable reference points on the frame of the vehicle to be measured, enabling a vehicle frame reference line to be established for relative alignment of the wheel assemblies and/or axles. Alternatively, additional angle sensor assemblies 300 within a set of angle sensor assemblies can be mounted to frame reference support structures 200 in place of the targets 202a, and can cooperatively function with the angle sensor assemblies 300 mounted to the vehicle wheel assemblies and/or axles to determine relative alignments.

When the number of additional reference structures 200 utilizing angle sensor assemblies 300, together with the number of axles on the vehicle, exceed the number of available pairs of sensor assemblies 300, one or more pairs of sensor assemblies 300 are repositioned from the reference structures 200 and/or measured axles to unmeasured axles, where they are compensated (if necessary) and utilized to acquire additional measurements, while at least one pair of sensor assemblies 300 is maintained on a measured axle to establish a reference axle aligned relative to the frame reference line as previously described.

Figure 10:
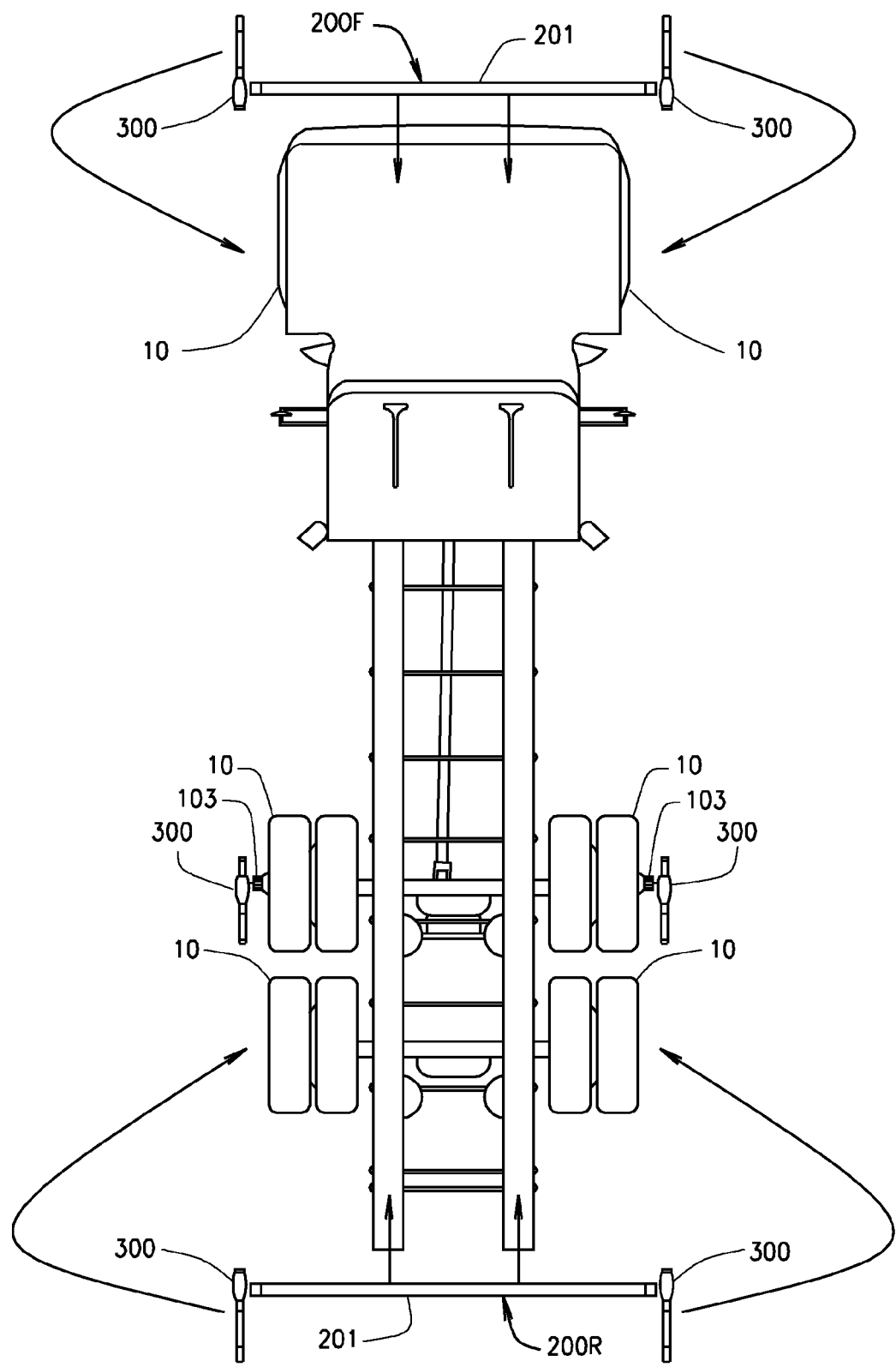
FIG. 10 is an illustration similar to FIG. 9, indicating exemplary movement of alignment angle sensor assemblies from the frame reference target structures to wheel assemblies on the vehicle axles during a frame-reference measurement procedure using three pairs of sensor assemblies.

For example, as shown in FIG. 10, when conducting a frame-reference measurement of a vehicle having three axles (one steered axle, and two fixed axles), a pair of reference structures are secured to suitable reference points at the front and rear of the vehicle frame. If three pairs of angle sensor assemblies 300 are available, one pair is initially mounted to the reference structure at the front of the vehicle frame, one pair is initially mounted to the reference structure at the rear of the vehicle frame, and one pair is initially mounted to a fixed axle of the vehicle which will be designated as the reference axle. Measurements are acquired from the angle sensor assemblies 300 mounted to the reference structures, and a vehicle frame reference line is established, against which the alignment of the fixed reference axle is determined. Once the alignment of the fixed reference axle is determined (and optionally adjusted) relative to the vehicle frame reference line, the reference structures are dismounted from the vehicle frame, and the angle sensor assemblies initially mounted there on are moved (as shown by the arrows in FIG. 10) to wheel assemblies on the remaining unaligned axles of the vehicle, compensated (if necessary), and used to acquire measurements to enable the unaligned axles to be aligned relative to the fixed reference axle.

The present disclosure can be embodied in-part in the form of computer-implemented processes and apparatuses for practicing those processes. The present disclosure can also be embodied in-part in the form of computer program code containing instructions embodied in tangible media, or another computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle wheel alignment system for measuring alignment angles associated with the wheel assemblies of a multi-axle vehicle, comprising:
   an alignment angle measurement system having components associated concurrently with at least two axles of the vehicle for acquiring alignment angle data from wheel assemblies;
   wherein said alignment angle measurement system is further configured with a pair of reference components to acquire measurement data from two longitudinally spaced locations associated with a frame of the vehicle, said measurement data representative of a location of a longitudinal reference line of said frame; and
   a processing system configured to receive said alignment angle data and said measurement data representative of said frame longitudinal reference line, said processing system configured with a set of software instructions to utilize said alignment angle data and said measurement data to determine one or more frame-referenced alignment angles and/or frame-referenced alignment angle adjustments for each of said at least two axles of the vehicle.

2. The vehicle wheel alignment system of claim 1 wherein said alignment angle measurement system components include a set of imaging sensors and a set of optical targets;
   wherein each of said optical targets is configured for mounting to a vehicle wheel assembly;
   wherein a plurality of imaging sensors within said set of imaging sensors said plurality of imaging sensors establishing a plurality of operative fields of view such that each of said optical targets mounted to said vehicle wheel assemblies are visible within at least one operative field of view; and
   wherein said processing system is configured with software instructions to receive images of said optical targets from said plurality of imaging sensors for processing to determine associated alignment angle data.

3. The vehicle wheel alignment system of claim 2 wherein said set of optical targets includes a quantity of optical targets sufficient to concurrently mount at least one optical target to an outermost wheel assembly on each end of each axle of said vehicle.

4. The vehicle wheel alignment system of claim 1 wherein said alignment angle measurement system components include a set of angle sensor assemblies, said set including a plurality of angle sensor assemblies configured for mounting to vehicle wheel assemblies; and
   wherein said processing system is configured with software instructions to receive angle data from said set of angle sensor assemblies for processing to determine associated alignment angle data.

5. The vehicle wheel alignment system of claim 1 wherein said longitudinal reference line of said frame of the vehicle is a longitudinal centerline of said frame.

6. A vehicle wheel alignment system for measuring alignment angles associated with the wheel assemblies of a multi-axle vehicle, comprising:

an alignment angle measurement system having components associated concurrently with at least two axles of the vehicle, said components including a set of optical targets each configured for mounting to a vehicle wheel assembly, and a set of imaging sensors configured to establish a plurality of operative fields of view such that each of said wheel assembly optical targets are visible within at least one operative field of view;

wherein said alignment angle measurement system further includes first and second frame reference target structures to acquire measurement data representative of a location of a longitudinal reference line of said frame of the vehicle;

said first frame reference target structure configured for mounting to a front longitudinal end of said vehicle support frame in a predetermined relationship to a vehicle frame to support at least one optical target within an operative field of view of at least one imaging sensor in said set of imaging sensors;

said second frame reference target structure configured for mounting to a rear longitudinal end of said vehicle support frame in a predetermined relationship to said vehicle frame to support at least one optical target within an operative field of view of at least one imaging sensor in said set of imaging sensors;

a processing system configured with software instructions to receive and process images of said optical targets supported on said first and second frame reference target structures and mounted to said vehicle wheel assemblies from said set of imaging sensors to determine wheel assembly alignment angle data and vehicle frame longitudinal reference line measurement data; and wherein said processing system is further configured with a set of software instructions to utilize said wheel assembly alignment angle data and said frame measurement data to determine one or more frame-referenced alignment angles and/or frame-referenced alignment angle adjustments for each of said at least two axles of the vehicle.

7. The vehicle wheel alignment system of claim 6 wherein said set of imaging sensors includes a first pair of imaging sensors disposed adjacent to a first longitudinal side of said vehicle, and a second pair of imaging sensors disposed adjacent to a second and opposite longitudinal side of said vehicle;

wherein each pair of imaging sensors includes at least
a first imaging sensor having a field of view directed longitudinally along said vehicle and encompassing both an optical target mounted to a front wheel axle and an optical target associated with said front frame reference target structure; and
a second imaging sensor having a field of view directed longitudinally along said vehicle and encompassing both an optical target mounted to at least a rear axle and an optical target associated with said rear frame reference target structure.

8. A vehicle wheel alignment system for measuring alignment angles associated with the wheel assemblies of a multi-axle vehicle, comprising:
a set of angle sensor assemblies for acquiring alignment angle data associated with said wheel assemblies on at least two axles of said vehicle;
first and second frame reference structures each configured to support at least one angle sensor assembly to acquire measurement data representative of a location of a longitudinal reference line of said frame of the vehicle, with said first frame reference structure configured for mounting to a front longitudinal end of said vehicle support frame in a predetermined relationship to a vehicle frame axis, and said second frame reference structure configured for mounting to a rear longitudinal end of said vehicle support frame in a predetermined relationship to a vehicle frame axis;
a processing system configured with software instructions to receive said alignment angle data from said angle sensor assemblies associated with said wheel assemblies, and said measurement data from said angle sensor assemblies supported on said first and second frame reference structures, said processing system configured with a set of software instructions to utilize said alignment angle data and said measurement data to determine one or more frame-referenced alignment angles and/or frame-referenced alignment angle adjustments for each of said at least two axles of said vehicle.

9. A method for determining wheel alignment angle measurements of a multi-axle vehicle having at least two axles and a frame assembly supporting said axles, comprising:
mounting a measurement devices on each outermost wheel assembly of at least two axles of the vehicle;
mounting a first measurement device in a predetermined position relative to a front longitudinal end of said frame assembly;
mounting a second measurement device in a predetermined position relative to a rear longitudinal end of said frame assembly;
obtaining alignment angle data from said measurement devices mounted to each of said wheel assemblies;
obtaining frame longitudinal reference line data from said first and second measurement devices mounted relative to said frame assembly; and
evaluating said alignment angle data and said frame longitudinal reference line data to determine at least one frame-referenced alignment angle measurement associated with each of said wheel assemblies.

10. The method of claim 9 wherein said frame longitudinal reference line data is representative of a longitudinal centerline of said frame.

11. A method for determining wheel alignment angle measurements of a multi-axle vehicle having at least two axles and a frame assembly supporting said axles, comprising:
mounting a measurement devices on each outermost wheel assembly of at least two axles of the vehicle;
mounting a set of measurement devices in a predetermined position relative to said frame assembly;
obtaining alignment angle data from said measurement devices mounted to each of said wheel assemblies;
obtaining frame longitudinal reference line data from said set of measurement devices mounted relative to said frame assembly;
evaluating said alignment angle data and said frame longitudinal reference line data to determine at least one frame-referenced alignment angle measurement associated with each of said wheel assemblies; and
conducting a common compensation procedure to obtain runout compensation data associated with each measurement device mounted to said wheel assemblies before obtaining alignment angle data, said common compensation procedure includes the steps of
acquiring a first set of compensation data from said measurement devices mounted to each of said wheel assemblies;

altering a position of the vehicle by rolling movement;

acquiring at least a second set of compensation data from said measurement devices mounted to each of said wheel assemblies;

and processing each of said sets of compensation data to determine said runout compensation data associated with each measurement device mounted to said wheel assemblies.

12. A method for determining wheel alignment angle measurements of a multi-axle vehicle having at least two axles and a frame assembly supporting said axles, comprising:

mounting a measurement device on each outermost wheel assembly of at least a reference axle of the vehicle;

positioning a first set of measurement devices relative to a front longitudinal end of said frame assembly;

positioning a second set of measurement devices relative to a rear longitudinal end of said frame assembly;

obtaining measurement data from said wheel-mounted measurement devices;

obtaining frame longitudinal reference line data from said first and second sets of measurement devices positioned in reference to said front and rear longitudinal ends of said frame assembly;

evaluating said measurement data and said frame longitudinal reference line data to determine at least one frame-referenced alignment angle measurement associated with said reference axle;

repositioning said first set of measurement devices onto outermost wheel assemblies of a first additional axle of the vehicle;

repositioning said second set of measurement devices onto outermost wheel assemblies of a second additional axle of the vehicle;

obtaining additional measurement data from said first and second sets of measurement devices; and evaluating said additional measurement data relative to said at least one frame-referenced alignment angle of said reference axle to determine at least one frame-referenced alignment angle measurement associated with each of said additional axles.

13. The method of claim 12 further including the step of adjusting a frame-referenced alignment angle associated with each additional axle in response to said frame-referenced alignment angle measurement.

14. The method of claim 12 wherein each of said measurement devices is an angle sensor, and wherein said steps of obtaining measurement data and obtaining additional measurement data from said measurement devices each include acquiring angle measurements from said angle sensors.

15. The method of claim 12 further including the step of conducting a compensation procedure to obtain runout compensation data associated with each measurement device mounted to a wheel assembly prior to said step of obtaining additional measurement data.

16. A method for determining wheel alignment angle measurements of a multi-axle vehicle having at least two axles and a frame assembly supporting said axles, comprising:

obtaining measurement data associated with a first axle of the vehicle, said first axle designated as a reference axle, and said obtained measurement data including at least one orientation measurement which is relative to a measured location of a longitudinal reference line of said frame assembly; and obtaining additional measurement data associated with a second axle of the vehicle, said additional measurement data including at least one orientation measurement which is relative to said orientation measurement of said reference axle, whereby an orientation of said second axle relative to said longitudinal reference line of said frame assembly is defined.

17. The method of claim 16 further including the step of altering an orientation of said reference axle relative to said measured location of said longitudinal reference line in response to said obtained measurement data prior to obtaining said additional measurement data associated with said second axle.

18. The method of claim 16 further including the step of altering an orientation of said second axle relative to said orientation of said reference axle in response to said obtained additional measurement data.

19. The method of claim 16 wherein said step of obtaining additional measurement data is repeated for each additional axle of the vehicle; and wherein said additional measurement data for each additional axle including at least one orientation measurement which is relative to said orientation measurement of said reference axle.

20. The method of claim 19 further including the step of altering an orientation of one or more of said additional axles relative to said orientation of said reference axle in response to said obtained additional measurement data.

* * * * *